June 28, 1955  J. R. WEEKS, JR  2,712,112
TESTING CIRCUIT FOR DIELECTRIC MATERIAL
Filed Nov. 26, 1952
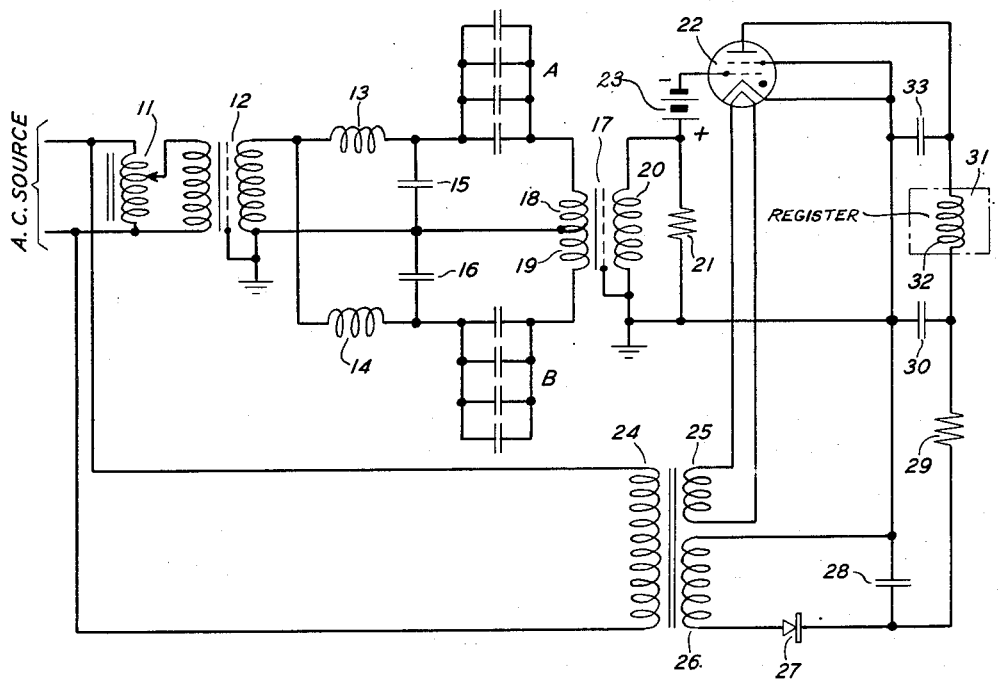
INVENTOR
J. R. WEEKS, JR.
BY John C. Morris
ATTORNEY 2,712,112

TESTING CIRCUIT FOR DIELECTRIC MATERIAL

John R. Weeks, Jr., South Orange, N. J., assignor to Bell Telephone Laboratories, Incorporated, New York, N. Y., a corporation of New York Application November 26, 1952, Serial No. 322,769

6 Claims. (Cl. 324—54)

This invention relates to testing means and more particularly to means for ascertaining and for indicating the breakdown of insulation.

A knowledge of the voltage at which insulation failure occurs is of interest with respect to various types of electrical apparatus. In some devices, such as metallized paper capacitors, the insulation failure or dielectric breakdown is only momentary, but is nevertheless objectionable in use because of the circuit disturbances caused. In establishing voltage ratings on metallized paper capacitors, it is important to have information on the rate of sparking, i. e., momentary dielectric failure, at various voltages.

One way of ascertaining sparking rates when direct-current potentials are applied to capacitors is by a testing arrangement for registering insulation failure, such as that disclosed in applicant's Patent 2,522,151, issued September 12, 1950. It has been found, however, that such an arrangement, although adaptable to alternating-current operation, is not entirely satisfactory. One reason for this is that there is a tendency for disturbances, such as voltage surges in the alternating-current line, to cause false register operation. Suitable filtering may be used to reduce the effect of such disturbances, but in many cases the amount of filtering needed would be excessive.

One object of this invention is to avoid false indications while making insulation failure measurements on devices subjected to alternating-current potentials.

Another object of this invention is to obviate the necessity of excessive filtering in accomplishing the foregoing object.

A feature of this invention resides in an alternating-current insulation testing circuit that comprises a balanced circuit arrangement in which line disturbances are cancelled and, therefore, do not reach the registering means.

Other and further objects and features of this invention will appear more fully and clearly from the following description of an illustrative embodiment thereof taken in connection with the appended drawing in which the single figure is a wiring diagram of such an illustrative embodiment.

The required alternating-current voltage is fed to the system by way of a variable voltage controller 11 and a shielded transformer 12. The secondary winding of the transformer 12 is connected to a balanced circuit including banks A and B of capacitors to be tested. The two banks should be of substantially equal capacitance in order that the bridge circuit may be in balance.

Coils 13 and 14 of substantially the same impedance form opposite arms of the bridge, being connected at their junction to one side of the secondary winding of transformer 12. The impedance of these coils is high at the frequency of the sparking potentials, so that they tend to keep these potentials out of the transformer windings.

The capacitors 15 and 16 comprise low impedance paths that allow the spark frequency currents to pass freely to the transformer 17 that connects the bridge to a register circuit. These capacitors are connected at their junction to the other side of the secondary winding of transformer 12.

The primary or input side of the transformer 17 comprises a balanced pair of windings 18 and 19 connected respectively in opposite arms of the bridge and separated from the secondary or output winding 20 by a grounded shield. The windings 18 and 19 are connected in series opposing relation and have their junction connected to the junction of capacitors 15 and 16, and thus to one side of the voltage source. The other sides of the windings 18 and 19 are connected respectively through the capacitor banks A and B to the respective junctions of coil 13 and capacitor 15, and of coil 14 and capacitor 16.

The secondary winding 20 of the transformer 17 is connected across a resistor 21, one end of which is connected to the cathode of the vacuum tube 22. The other end of the resistor 21 is connected to the control grid of the tube 22 through a biasing battery 23. The tube 22 advantageously is a trigger tube such as a thyratron.

The power supply to the tube 22 is through a transformer, the primary winding 24 of which is connected to the alternating current supply. A secondary winding 25 is connected to the heater of the tube and the anode circuit receives its current from another secondary winding 26.

The secondary winding 26 is connected through a rectifier 27 and a smoothing capacitor 28 to a circuit loop including the resistor 29 and the capacitor 30. The register 31, which includes the winding 32 of a register operating electromagnet is connected between one side of the capacitor 30 and the anode of the tube 22. The other side of the capacitor 30 is connected to the tube cathode. A capacitor 33 is connected between the anode and the cathode of the tube 22.

Due to the series opposing connection of the primary windings 18 and 19 of the transformer 17, line disturbances which divide equally between the balanced halves of the bridge will induce no voltage in the secondary winding 20. Thus, no register operation is effected by such disturbances. On the other hand, a disturbance in the circuit 13, 15, 18, A or 14, 16, 19, B will be passed through the transformer to operate the register. Disturbances due to sparking in either condenser bank A or B will therefore operate the register to give a measure of sparking rate.

During the time that the tube 22 is non-conducting, the capacitor 30 in the noted loop of the anode circuit is charged from transformer winding 26 through the rectifier 27, smoothing capacitor 28 and the resistor 29. When the tube 22 becomes conducting, the capacitor 30 discharges through the coil 32 of the register magnet to operate the register 31.

The tube 22 which is normally biased to the non-conducting condition by the battery 23, is rendered conducting by a sparking voltage opposed to this bias. The sparking voltages from the capacitor banks A and B, impressed on the resistor 21, are of the proper magnitude and direction to reduce the grid bias sufficiently to allow the tube 22 to become conducting.

After discharge of the capacitor 30, the tube is again rendered non-conducting through the joint action of the magnet coil 32 and the capacitor 33 in reducing the anode voltage below zero and allowing the grid to regain control.

Since alternating-current line disturbances are balanced out, while those due to sparking of the capacitors under test are passed on to the register, the proper measure of the sparking rate at a given voltage may be obtained without false register operation due to line disturbances.

What is claimed is:

1. A system for indicating breakdown of electrical insulation comprising a tube having an input and an output circuit and responsive to voltage impulses in the input circuit, impulse registering means connected in the output circuit, a double bridge circuit of which two adjacent arms are substantially equal inductances and the other adjacent arms are substantially equal capacitances, a transformer having a primary and a secondary winding, the primary winding having mid-point and end terminals, the secondary winding connected across the input circuit of the tube, and the mid-point terminal of the primary winding connected to the junction of the capacitances, two substantially equal specimens of insulation to be tested, one connected between one capacitance-inductance junction and one end terminal of the primary winding, and the other connected between the other capacitance-inductance junction and the other end terminal, a source of alternating voltage, and connecting means for applying from the source a desired voltage between the junction of the inductances and that of the capacitances.

2. A system for indicating breakdown of electrical insulation comprising a trigger tube having an input and an output circuit and responsive to voltage impulses in the input circuit, impulse registering means connected in the output circuit, a double bridge circuit having a pair of equal inductance arms and a pair of equal capacitance arms, a transformer having a primary and a secondary winding, the primary winding including means for making mid-point and end connections thereto, the secondary winding connected across the input circuit of the trigger tube, and the mid-point of the primary winding connected to the junction of the capacitance arms, two substantially equal specimens of insulation to be tested, connected respectively between the junctions of the capacitance and the inductance arms and the end terminals of the primary winding, a source of alternating voltage, and connecting means for applying from the source a desired voltage between the junction of the inductance arms and that of the capacitance arms.

3. A system for indicating the rate of sparking in metallized paper capacitors comprising a trigger tube having an input and an output circuit, impulse registering means connected in the output circuit, a double bridge circuit of which two adjacent arms are substantially equal inductances and the other adjacent arms are substantially equal capacitances, a transformer having a primary winding with mid-point and end terminals, and a secondary winding, the secondary winding connected across the input circuit of the trigger tube, and the mid-point of the primary winding connected to the junction of the capacitances, two substantially equal banks of capacitors to be tested, connected respectively between the capacitance-inductance junctions of the bridge and the end terminals of the primary winding, a source of alternating voltage and variable means connected between the junction of the inductances and that of the capacitances for applying from the source a desired voltage.

4. A system for indicating breakdown of electrical insulation comprising a trigger tube having an input and an output circuit, registering means connected in the output circuit, a balanced bridge circuit of which two adjacent arms are inductive impedances and the other adjacent arms are capacitative impedances, a transformer having a balanced, center tapped primary winding having end terminals, and a secondary winding, the secondary winding connected across the input of the trigger tube and the center tap of the primary winding connected to the junction of the capacitative impedances, two substantially equal specimens of insulation to be tested, one each connected respectively between one and the other of the capacitative impedance-inductive impedance junctions and the end terminals of the primary winding, a source of alternating voltage and conecting means for applying from the source a desired voltage between the junctions of the inductive and the capacitative impedances.

5. Means for registering the sparking rate of metallized paper capacitors comprising a thyratron tube, spark impulse registering means connected to the output of the tube, a bridge circuit of which two arms are substantially equal inductances and the other arms are substantially equal capacitances, a transformer having a primary winding with mid-point and end connections, and a secondary winding, the secondary winding connected to the input of the tube, and the mid-point of the primary winding connected to the junction of the capacitances, two banks of metallized paper capacitors having substantially equal capacitances, one bank connected for testing between one of the capacitance-inductance junctions and one end of the primary winding, and the other bank connected for testing between the other of the capacitance-inductance junctions and the other end of the primary winding, a source of alternating voltage and connecting means for applying from the source a desired voltage between the junction of the inductances and that of the capacitances.

6. A system for indicating breakdown of electrical insulation comprising a trigger tube, registering means connected to the output of the tube, a bridge circuit having a substantially matched pair each of inductive and capacitative arms, a transformer having a balanced pair of primary windings and a secondary winding, the secondary winding connected to the input of the trigger tube, and the junction of the pair of primary windings connected to the junction of the capacitative arms, two substantially equal specimens of insulation to be tested, connected respectively between the junction of the capacitative and inductive arms of the bridge and the ends of the primary windings, a source of alternating voltage and connecting means for applying from the source a desired voltage between the junction of the inductive arms and of the capacitative arms of the bridge.

No references cited.